United States Patent
Kennedy

(10) Patent No.: US 11,480,252 B2
(45) Date of Patent: Oct. 25, 2022

(54) GATE VALVE

(71) Applicant: Kennedy Valve Company, Elmira, NY (US)

(72) Inventor: Paul Kennedy, Horseheads, NY (US)

(73) Assignee: KENNEDY VALVE COMPANY, Elmira, NY (US)

(*) Notice: Subject to any disclaimer, the term of this patent is extended or adjusted under 35 U.S.C. 154(b) by 0 days.

(21) Appl. No.: 17/537,297

(22) Filed: Nov. 29, 2021

(65) Prior Publication Data
US 2022/0099197 A1    Mar. 31, 2022

Related U.S. Application Data

(63) Continuation of application No. 17/038,585, filed on Sep. 30, 2020, now Pat. No. 11,231,112.

(51) Int. Cl.
*F16K 3/14* (2006.01)
*F16K 3/02* (2006.01)
*F16K 31/52* (2006.01)

(52) U.S. Cl.
CPC .............. *F16K 3/14* (2013.01); *F16K 3/0227* (2013.01); *F16K 31/523* (2013.01)

(58) Field of Classification Search
CPC ........ F16K 3/14; F16K 3/0227; F16K 31/523; F16K 3/0281
USPC ................................. 251/203–204, 326–329
See application file for complete search history.

(56) References Cited

U.S. PATENT DOCUMENTS

| | | | | |
|---|---|---|---|---|
| 1,360,164 A | ‡ | 11/1920 | Whiteman | F16K 3/14 251/195 |
| 1,644,775 A | ‡ | 10/1927 | Fulton | F16K 31/523 251/229 |
| 2,075,123 A | * | 3/1937 | Lunken | F16K 3/314 251/327 |
| 2,948,503 A | ‡ | 8/1960 | Williams | F16K 3/14 251/85 |
| 2,964,291 A | ‡ | 12/1960 | Williams | F16K 3/14 251/327 |
| 3,400,441 A | ‡ | 9/1968 | Fryling | F16K 3/14 29/890.122 |
| 4,294,427 A | ‡ | 10/1981 | Cilny | F16K 3/14 251/158 |
| 4,367,766 A | ‡ | 1/1983 | Uomala | F16K 3/12 137/243 |
| 5,722,636 A | ‡ | 3/1998 | Houston | F16K 3/186 251/167 |

(Continued)

*Primary Examiner* — John Bastianelli
(74) *Attorney, Agent, or Firm* — Brown & Michaels, PC

(57) ABSTRACT

A gate for a gate valve includes a first body portion and a second body portion. The first body portion has a disc shape and a first wedging element extending from the disc shape. The second body portion has a disc shape and a second wedging element extending from the disc shape. The second body portion is pivotably connected to the first body portion. A gate valve includes a valve body and the gate. The valve body includes a first opening, a second opening, a flow passage from the first opening to the second opening, and a gate channel intersecting the flow passage. The gate is configured to move along a center axis of the gate channel between a closed position where the gate is fully in the flow passage to block fluid flow through the flow passage and an open position where fluid can flow through the flow passage.

25 Claims, 13 Drawing Sheets

(56) References Cited

U.S. PATENT DOCUMENTS 8,297,590 B2 * 10/2012 Arriens, Jr. ............. F16K 3/186
251/169
2014/0252255 A1 ‡ 9/2014 Arora ....................... F16K 3/14
251/197

\* cited by examiner
‡ imported from a related application

GATE VALVE

CROSS REFERENCE TO RELATED APPLICATIONS

This application is a continuation of co-pending U.S. patent application Ser. No. 17/038,585, filed Sep. 30, 2020, entitled "Gate Valve", which is incorporated by reference.

BACKGROUND OF THE INVENTION

Field of the Invention

The invention pertains to the field of valves. More particularly, the invention pertains to wedge gate valves.

Description of Related Art

Gate valves have been used for centuries in water supply systems to control the flow of water or other fluids through pipes. For example, gate valves are often used in fire protection applications to close off water mains. Referring to FIG. 1 and FIG. 2, one such wedge gate valve 10 has a valve body 12 with a flow passage 13 between an inlet 14 and an outlet 16, and first and second flanges 18, 19 at the inlet 14 and the outlet 16. The flanges 18, 19 are used to bolt the gate valve 10 stably to other water supply system components (not shown).

A gate 20 fits in a gate channel 22 inside the valve body 12. The gate 20 can be moved into a closed position—fully into the flow passage 13 from the gate channel 22—to block water flow between the inlet 14 and the outlet 16. The gate 20 can also be moved into an open position—withdrawn somewhat from the flow passage 13 into the gate channel 22—such that water can flow through the valve body 12.

When the gate 20 is moved from the gate channel 22 to the closed position, a rigid wedge portion 24 of the gate valve 20 mates with a sealing surface 26 that extends semi-annularly from an end of the gate channel 22 into a portion of the flow passage 13. The gate channel 22 has a width to accommodate a width of the wedge portion 24 plus some additional clearance. Toward the flow passage 13, the width of the gate channel 22 narrows so that as the gate 20 moves to the closed position, the wedge portion 24 abuts and seals against the sealing surface 26. The portion of the sealing surface 26 that extends into the flow passage 13 is created by a recess or slot 28 into a perimeter surface 30 of the flow passage 13.

The recess 28 tapers into the perimeter surface 30 of the flow passage 13. At a corresponding position on the perimeter of the gate 20, which is to the gate channel side of a plane that is perpendicular to a center axis 32 of the gate channel 22 and that is parallel and intersecting with a center axis 34 of the flow passage 13, the wedge portion 24 abruptly or sharply transitions to a non-wedge portion 36. The non-wedge portion 36 can have a constant width. A radially outward-facing surface 38 of the non-wedge portion 36 abuts against the perimeter surface 30 of the flow passage 13 in the closed position to seal the flow passage 13. A width of the rigid wedge portion 24 drives a width of the gate channel 22, which must be sized larger than the width of the non-wedge portion 36 to accommodate the larger width of the wedge portion 24. In turn, the size of the wedge portion 24 and the gate channel 22 affect the size of other parts and the overall size and weight of the gate valve 10. Further, with the sharp transition from wedge portion 24 to non-wedge portion 36, the parts must be manufactured with relatively tight dimensional tolerances in order to yield a reliable and consistent seal.

The gate 20 is connected to a stem 40 at a first end 42 of the stem 40, which is moved along the center axis 32 of the stem 40 to move the gate 20 between the open and closed positions. The stem 40 can be partly or fully threaded. The gate 20 can be connected to the first end 42 by a collar or swivel 41, which is internally threaded to engage the threaded portion of the stem 40, allowing the stem 40 to rotate and drive the gate 20 linearly along the center axis 32 while the gate channel 22 and wings 44 engaging a corresponding channel (not shown) in the recess 28 of the gate 20 prevent the gate 20 from rotating. In various embodiments, rotation of the stem 40 can be driven manually or automatically.

The stem 40 extends away from the flow passage 13 and the gate 20 through the gate channel 22 to and through a valve cover 46, which is mounted on a third flange 48 at the gate channel 22. A seal 50 is compressed between a flat surface of the valve cover 46 and the third flange 48. The size of the third flange 48, which adds additional weight itself to the wedge gate valve 10, is sized large enough to accommodate the size of the gate channel 22 and wedge portion 24. Due to the size and weight of the wedge gate valve 10, four or more bolts 52 are required to secure the valve cover 46 to the flange 48.

A seal plate 54 is bolted to the valve cover 46 to cover and seal an opening 56 in the valve cover 46 over the stem 40. Bolts 58 are used to secure the seal plate 54 and to compress a seal element 60 between the seal plate 54 and the valve cover 46 to facilitate making a fluid-tight seal there.

SUMMARY OF THE INVENTION

A wedge gate and gate valve are disclosed herein that, compared to conventional wedge gates and wedge gate valves, have a reduced size and weight, improved structural strength, and improved sealing functionality.

In an embodiment, a gate valve includes a valve body and a gate. The valve body includes a first opening, a second opening, a flow passage from the first opening to the second opening, and a gate channel intersecting the flow passage. The gate is configured to move along a center axis of the gate channel between a closed position where the gate is fully in the flow passage to block fluid flow through the flow passage and an open position where fluid can flow through the flow passage. The gate includes a first body portion having a disc shape and a first wedging element extending from the disc shape; and a second body portion having a disc shape and a second wedging element extending from the disc shape. The second body portion is pivotably connected to the first body portion.

In an embodiment, a gate for a gate valve includes a first body portion and a second body portion. The first body portion has a disc shape and a first wedging element extending from the disc shape. The second body portion has a disc shape and a second wedging element extending from the disc shape. The second body portion is pivotably connected to the first body portion.

DETAILED DESCRIPTION OF THE INVENTION

Figure 1:
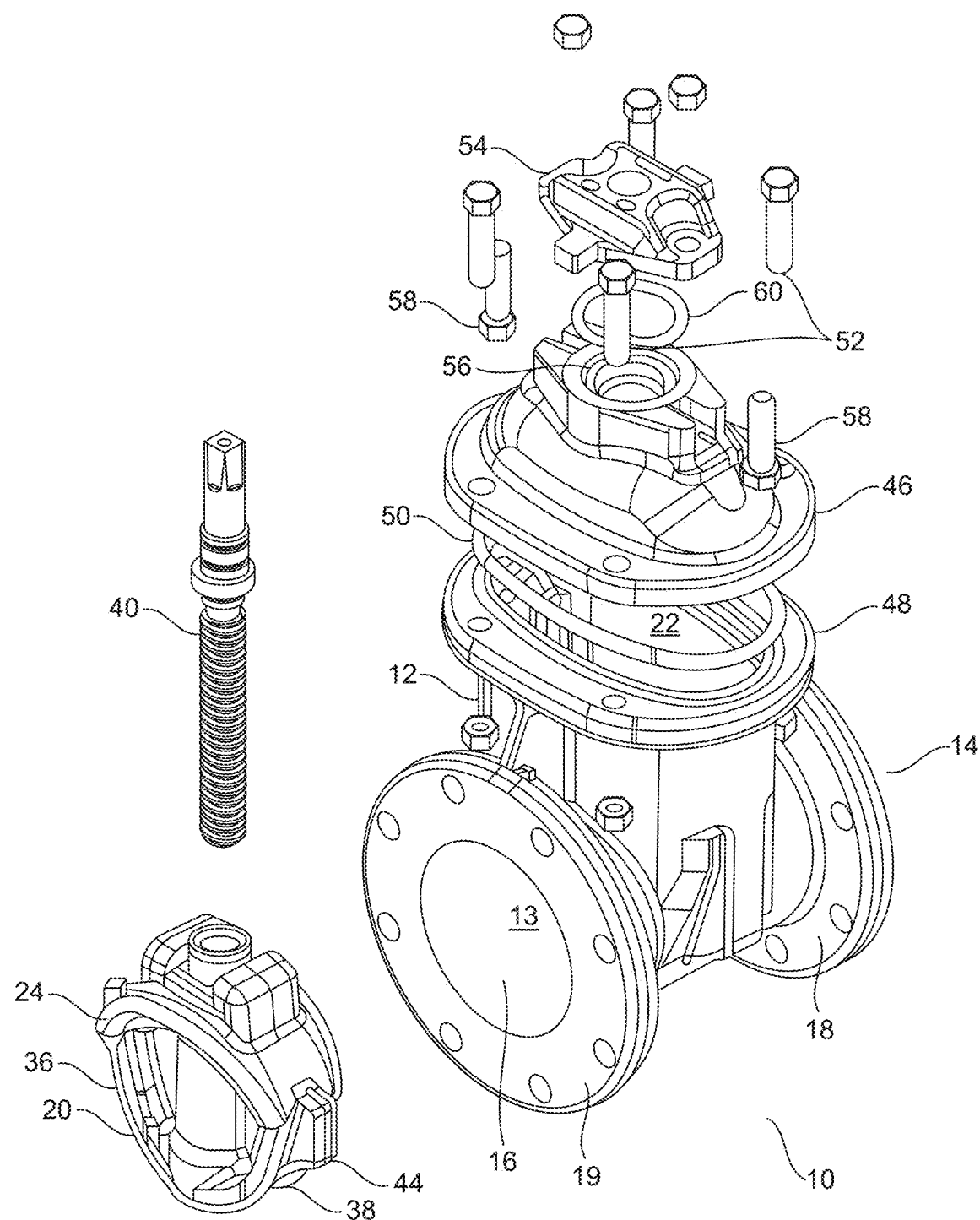
FIG. 1 shows an exploded view of a gate valve according to a conventional embodiment.
Figure 2:
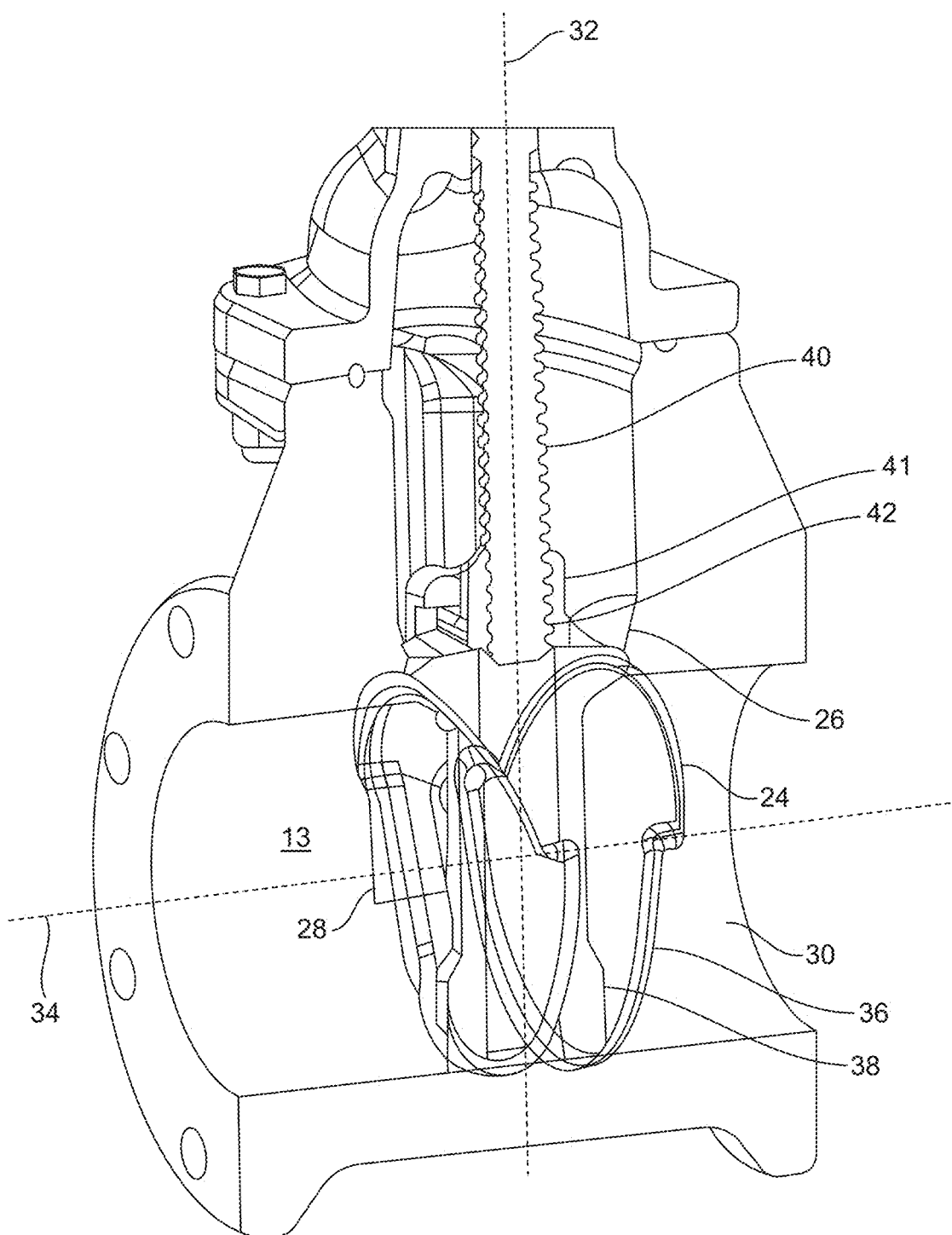
FIG. 2 shows a partial section of a gate valve, with a transparent view of a gate, and with sealing surfaces of the gate highlighted, according to the conventional embodiment of FIG. 1.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
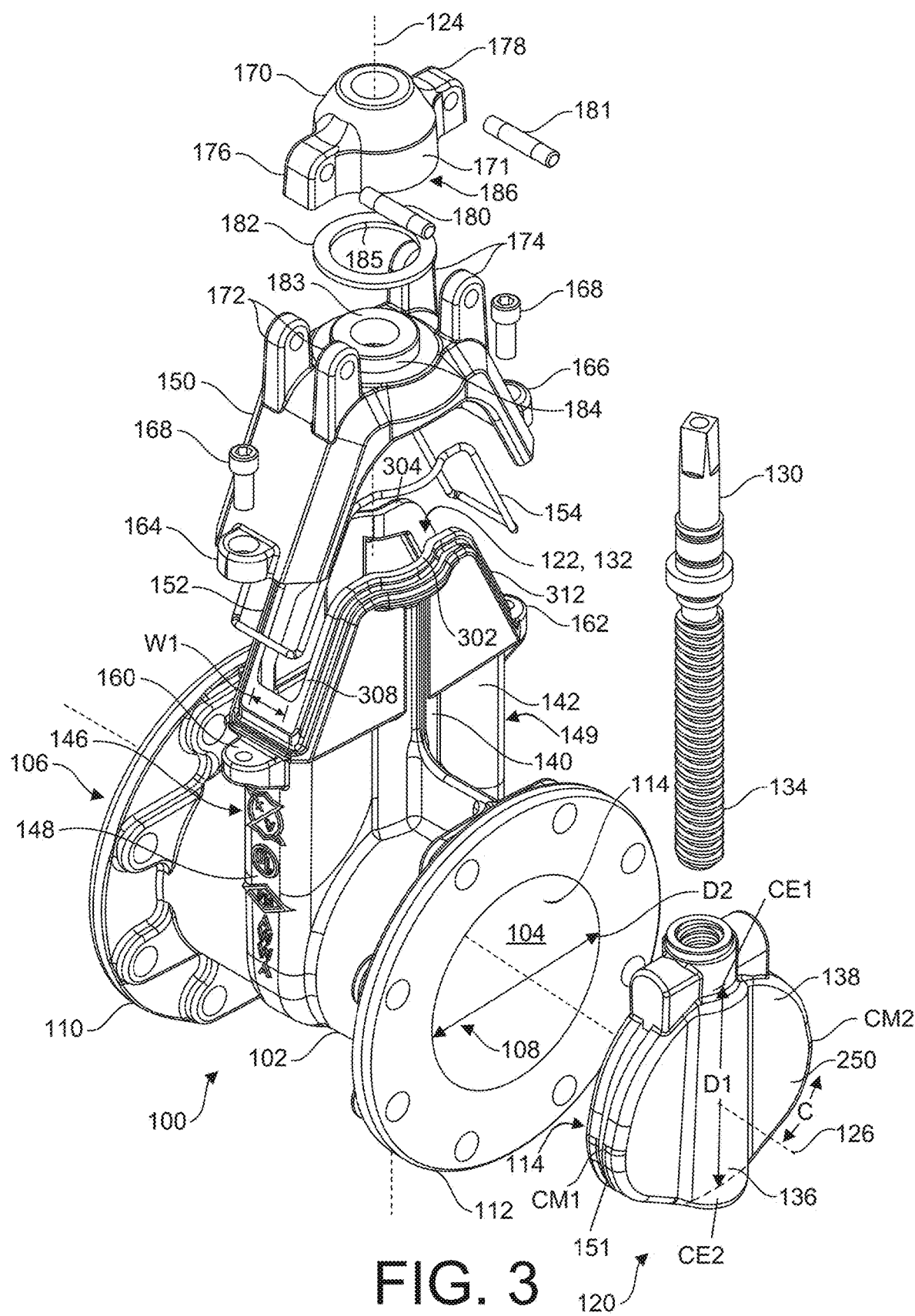
FIG. 3 shows a perspective view of a disassembled wedge gate valve, according to an embodiment.

Embodiments of a wedge gate valve are disclosed herein that utilize a flexible wedge gate design providing a reduced size and weight of the wedge gate valve, and an improved sealing function of the gate in a closed position. FIG. 3 shows a perspective view of a disassembled wedge gate valve 100, according to an embodiment. Referring to FIG. 3, the wedge gate valve 100 has a valve body 102 with a flow passage 104 between an inlet 106 and an outlet 108, and first and second flanges 110, 112 at the inlet 106 and the outlet 108. The flanges 106, 108 are used to bolt the gate valve 100 to other water supply system components (not shown). Fluid can flow through the flow passage 104, which is defined by a cylindrical, radially inward-facing perimeter surface 114.

Fluid flow through the flow passage 104 can be regulated by moving a gate 120 between an open position and a closed position. In FIG. 3, the gate 120 is shown outside the valve body 102, but the gate 120 is configured to be inside the valve body 102 and moved in a gate channel 122 between the open and closed positions. The gate channel 122 intersects the flow passage 104. In the depicted embodiments, the gate channel 122 and a center axis 124 of the gate channel 122 are perpendicular to the flow channel 104 and a center axis 126 of the flow channel 104, but it is conceived that the flow channel 104 can intersect the gate channel 122 at any angle. As discussed further herein below, the gate channel 122 has a smaller width and weight than conventional wedge gate valves.

In the closed position, the gate 120 is positioned as far as it will go into the flow passage 104, to seal off the flow passage 104. In the closed position, some of the gate 120 can also still extend out of the flow passage 104 into the gate channel 122. In an open position, the gate 120 is moved toward the gate channel 122, away from the closed position, or in other words, withdrawn somewhat from the flow passage 104 into the gate channel 122, enough to eliminate the sealing of the flow passage 104 and allow fluid to flow through the flow passage 104. In a fully open position, the gate 120 is moved as far as it will go into the gate channel 122 and out of the flow passage 104, or entirely out of the flow passage 104.

To move the gate 120 between the fully open position and the closed position, the gate 120 can be connected to a stem 130, such that rotation of the stem 130 moves the gate 120. When the gate 120 is in the valve body 102, the stem 130 can extend from the gate 120 through the gate channel 122, and through an opening 132 of the gate channel 122 at an end of the gate channel 122 opposite the intersection of the gate channel 122 with the flow passage 104. In the depicted embodiment, the stem 130 has a threaded portion 134 configured to engage a threaded portion 135 of the gate 120, such that as a result of rotation of the stem 130, the gate channel 122 prevents the gate 120 from rotating with the stem 130, and the gate 120 is threaded linearly along the threaded portion 134.

To facilitate the smooth movement of the gate 120 in the gate channel 122, the gate 120 can have a center guide 136, which is a convex ridge extending across a first side 138 of the gate 120 along a diameter D1 of the gate 120. The center guide 136 can be congruent with a concave slot 140 extending along a center of a first side wall 142 of the gate channel 122. A second side 144 of the gate 120 opposite the first side 138 can also have a center guide, and a second side wall 146 of the gate channel 122 opposite the first side wall 142 can also have a concave slot. The gate channel 122 is also defined by a third side wall 148 and a fourth side wall 149 opposite the third side wall 148. The third and fourth side walls 148, 149 are between the first and second sidewalls 142, 146. The distance between the first and second side walls 142, 146 (i.e., across the third and fourth sidewalls 148, 149) defines a width W1 of the gate channel 122, which is shorter than the distance between the third and fourth side walls 148, 149 (i.e., across the first and second side walls 142, 146). The convex ridge(s) and the concave slot(s) can have uniform curvature across their respective lengths to facilitate sliding of the convex ridge(s) within or against the concave slot(s).

With the center guide 136 and concave slot 140, side rails or wings extending from a circumferential side 151 of the gate 120 are unnecessary. The circumferential side 151 defines a circumference C, a first circumferential endpoint CE1, a second circumferential endpoint CE2, and two circumferential midpoints CM1, CM2, the first circumferential endpoint CE1 being at an intersection of the diameter D1 and the circumference C, the second circumferential endpoint CE2 being at an intersection of the diameter D1 and the circumference C, the first and second circumferential midpoints CM1, CM2 each being half way between the first and second circumferential endpoints, the circumferential side extending in a continuous curve through the circumferential midpoints CM1, CM2. The circumferential side 151 defines the radially outermost surface of the gate 120 at the first and second circumferential midpoints CM1, CM2. In other words, no rails or wings protruding from the circumferential side 151 of the gate 120 are necessary.

Figure 4A:
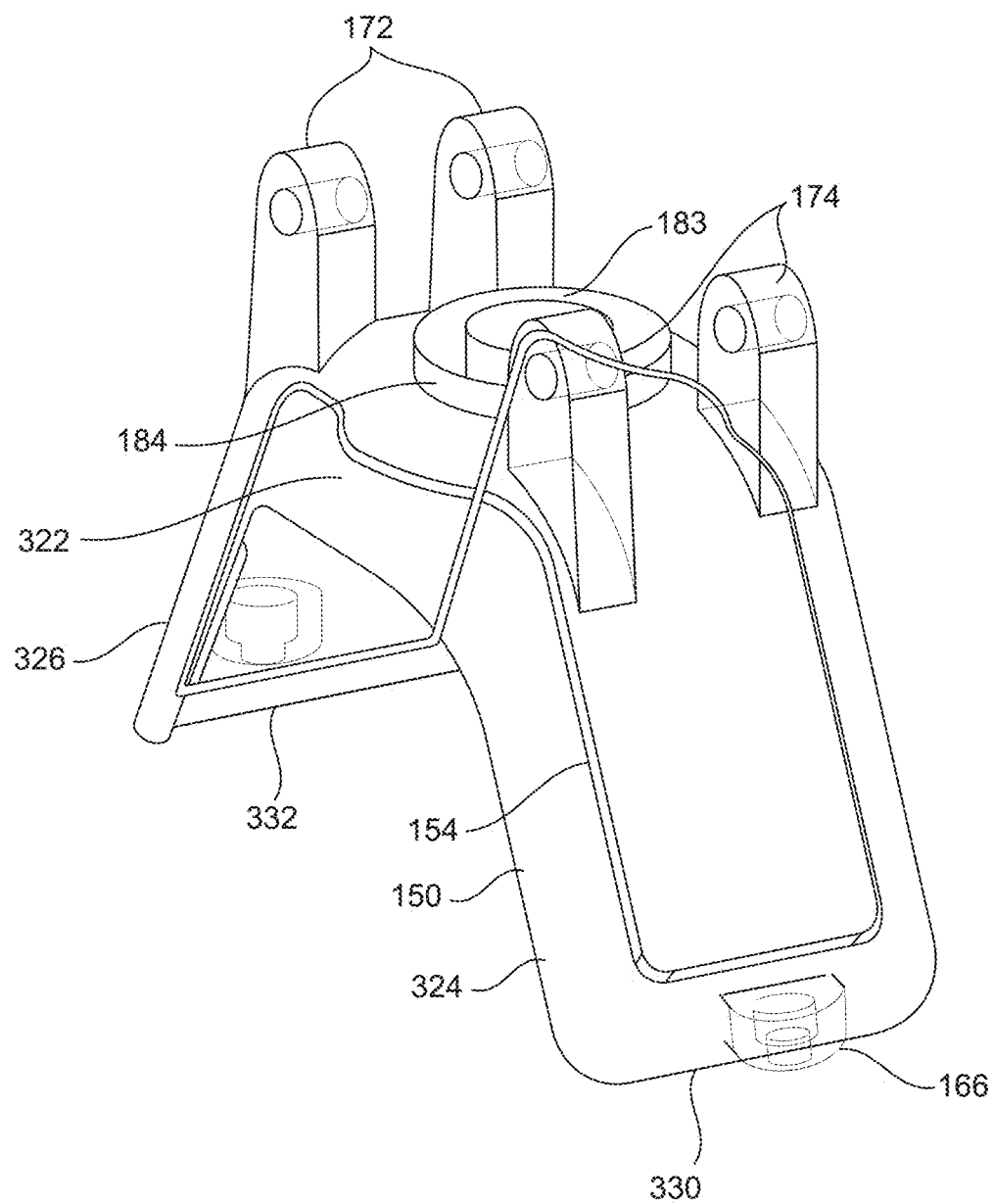
FIG. 4A shows a valve cover and seal.
Figure 4B:
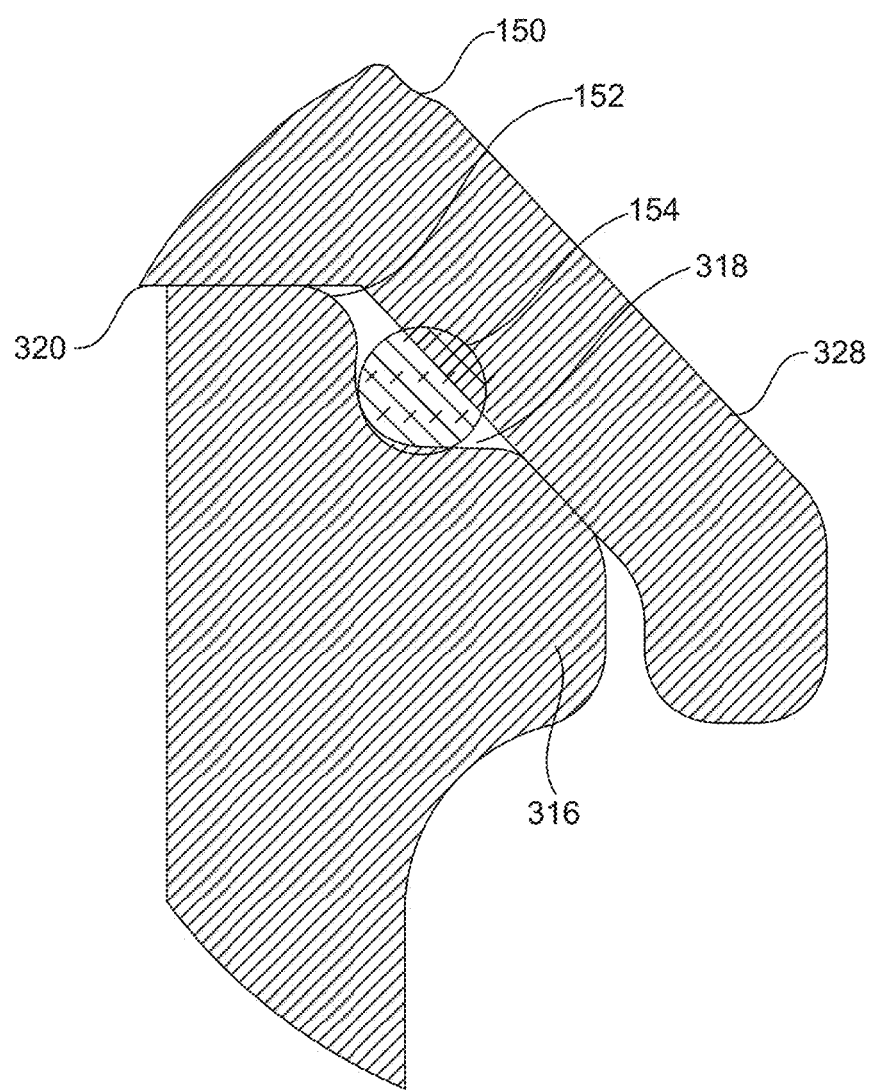
FIG. 4B shows a cross section of a portion of the valve cover and seal of FIG. 4A assembled on a ridge defining an opening of a gate channel.

The opening 132 of the gate channel 122 can be covered with a valve cover 150. The valve cover 150 is shaped and sized to fit and mate with a ridge 152 defining the opening 132. A seal 154 can also be sized and shaped to fit on the ridge 152, and to be sandwiched between the ridge 152 and the valve cover 150. FIG. 4A shows a semi-transparent perspective view of the valve cover 150 revealing the seal 154 installed on the valve cover 150, and FIG. 4B shows a cross section of a portion of the valve cover 150 and the seal 154 of FIG. 4A assembled on the ridge 152. Referring to FIGS. 3, 4A, and 4B, the ridge 152 exists in multiple planes. A first section 302 of the ridge 152 and a second section 304 discontinuous with the first section 302 each extend in a first plane. A third section 308 extends in a second plane angled toward the axis 126 from the first plane. The third section 308 connects the first section 302 and the second section 304. Similarly, a fourth section 312 extends in a third plane also angled toward the axis 126. The fourth section 312 also connects the first section 302 and the second section 304. Along each of the sections 302, 304, 308, 312, as seen in FIG. 4B, the ridge 152 includes a lip 316, defining a seal channel 318 around the perimeter of the ridge 152.

The valve cover 150 has a corresponding shape, with a first mating surface 320 to mate with the ridge 152 along the first section 302, the second section 304, the third section 308, and the fourth section 312. The valve cover 150 has a first section 322 configured to cover the first section 302 and the second section 304 of the ridge 352, a second section 324 angled similar to the third section 308 of the ridge 152 to cover the third section 308 of the ridge 152, and a third section 326 angled similar to the fourth section 312 of the ridge 152 to cover the fourth section 312 of the ridge 152. The valve cover 150 also has a clamping extension 328 extending at an angle from parallel with the first mating surface 320. The clamping section 328 is on two opposing sides of the first section 322, the second section 324, and the third section 326 of the valve cover 150, such that pressing the valve cover 150 onto the ridge 152 creates force components on the lip 316 and the seal 154 perpendicular to the axis 124 of the gate channel 22, in addition to the force component acting parallel to the axis 124 of the gate channel 22. Configure the angle to be 45 degrees yields equal force components, though the angle can be any desirable number of degrees. At an end 330 of the second section 324 of the valve cover 150, and at an end 332 of the third section 326 of the valve cover 150, the clamping section 328 can be omitted, and a force component acting perpendicular to the axis 124 of the gate channel 22 can still be achieved because the second section 324 and the third section 326 are at an angle non-perpendicular with the axis 124 of the gate channel 22. The second and third sections 324, 326 can match the angle of the clamping section 328 with respect to the first mating surface 320. Securing the valve cover 150 with force components in directions parallel and perpendicular to the axis 124 of the gate channel 22 decreases the quantity of bolts necessary to secure the valve cover 150, facilitating improved structural strength, a better seal, and easier assembly/disassembly.

Referring again to FIG. 3, on the third side wall 148 of the gate channel 122 and the fourth side wall 149 opposite the third side wall 148 are a first bolt flange 160 and a second bolt flange 162. The first bolt flange 160 is just large enough for one bolt hole to extend therethrough, and the first bolt flange 160 is contained on just the third side wall 156, though it is conceived that the first bolt flange 160 can extend onto the first side wall 142 and/or the second side wall 146. Minimizing the first bolt flange 160 reduces size, weight, and material. Similarly, the second bolt flange 162 is just large enough for one bolt hole to extend therethrough, and the second bolt flange 162 is contained on just the fourth side wall 158, though it is conceived that the second bolt flange 162 can extend onto the first side wall 142 and/or the second side wall 146. Minimizing the second bolt flange 162 reduces size, weight, and material.

Corresponding bolt flanges 164, 166 are positioned on the valve cover 150, and bolts 164 can extend through the pair of bolt flanges 160, 164 and through the pair of bolt flanges 162, 166 to secure the valve cover 150 to the valve body 102. Facilitated by the reduced size and weight of the wedge gate valve 100 over conventional wedge gate valves, as well as the clamping force of the top cover 150 on the valve body 102, no more than two bolts are necessary to secure the top cover 150 to the valve body 102.

A valve cover cap 170 is attached to the valve cover 150. The valve cover 150 has a first pair of pin flanges 172 and a second pair of pin flanges 174. The valve cover cap 170 can have a body portion 171 (e.g., cylindrical), from which a first pin flange 176 and a second pin flange 178 extend radially outward. Each pin flange 176, 178 can have a pin hole with an axis oriented perpendicular to a center axis of the valve cover cap 170 (e.g., axis 124 in FIG. 3). A first pin 180 can be inserted through the first pair of pin flanges 172 of the valve cover 150 and the first pin flange 176 of the valve cover cap 170. A second pin 181 can be inserted through the second pair of pin flanges 174 of the valve cover 150 and the second pin flange 178 of the valve cover cap 170.

A seal element or gasket 182 can seal between the valve cover 150 and the valve cover cap 170. The valve cover 150 has a first sealing surface 183 sized and shaped to mate with the gasket 182. The valve cover 150 also has a second sealing surface 184 rising from the first sealing surface 183. The second sealing surface 184 is configured to extend through the gasket 182 and contact or seal against a radially inwardly facing surface 185 of the gasket 182 surface.

The valve cover cap 170 has a hollow interior, with a sealing surface 186 also sized and shaped to mate with the gasket 182, such that the valve cover cap 170 can be fitted over and around the second sealing surface 184 onto the gasket 182, and pushed downward to compress the gasket 182 between the first sealing surface 183 of the valve cover 150 and the sealing surface 186 of the valve cover cap 170. Then the first pin 180 and the second pin 181 can be assembled to secure the valve cover cap 170 to the valve cover 150. Assembly and disassembly with the pins requires less effort than assembly and disassembly with the conventional bolts.

Figure 5:
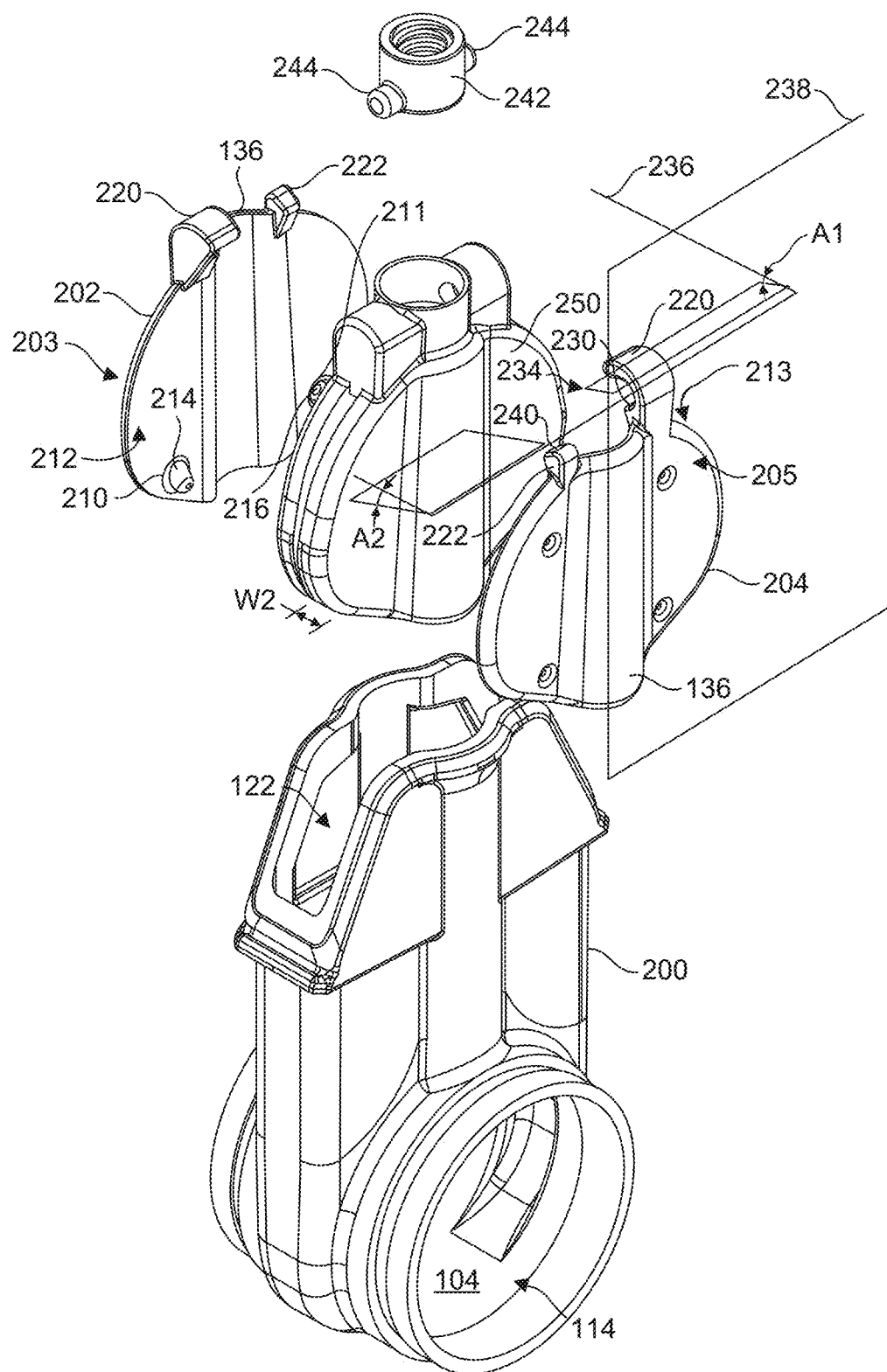
FIG. 5 shows a disassembled wedge gate valve and disassembled gate, according to an embodiment.
Figure 6:
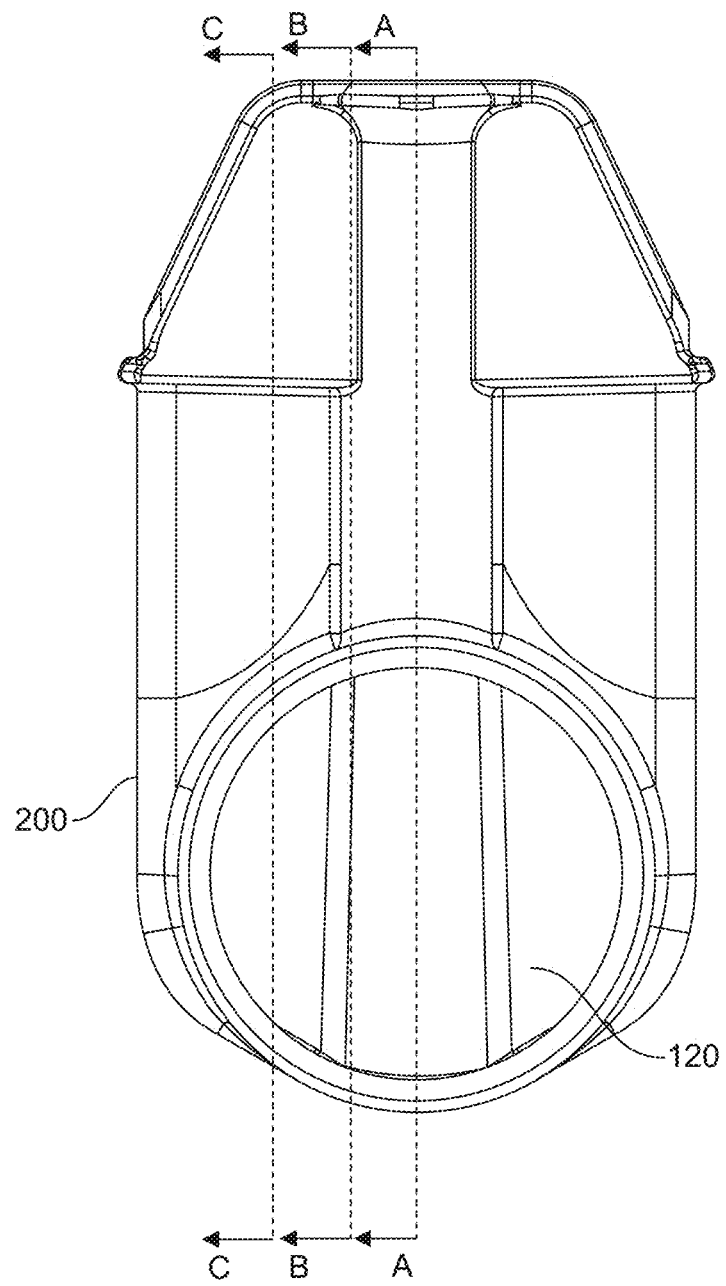
FIG. 6 shows a front view of the wedge gate valve of FIG. 4A, with the wedge gate in a gate valve body.
Figure 7:
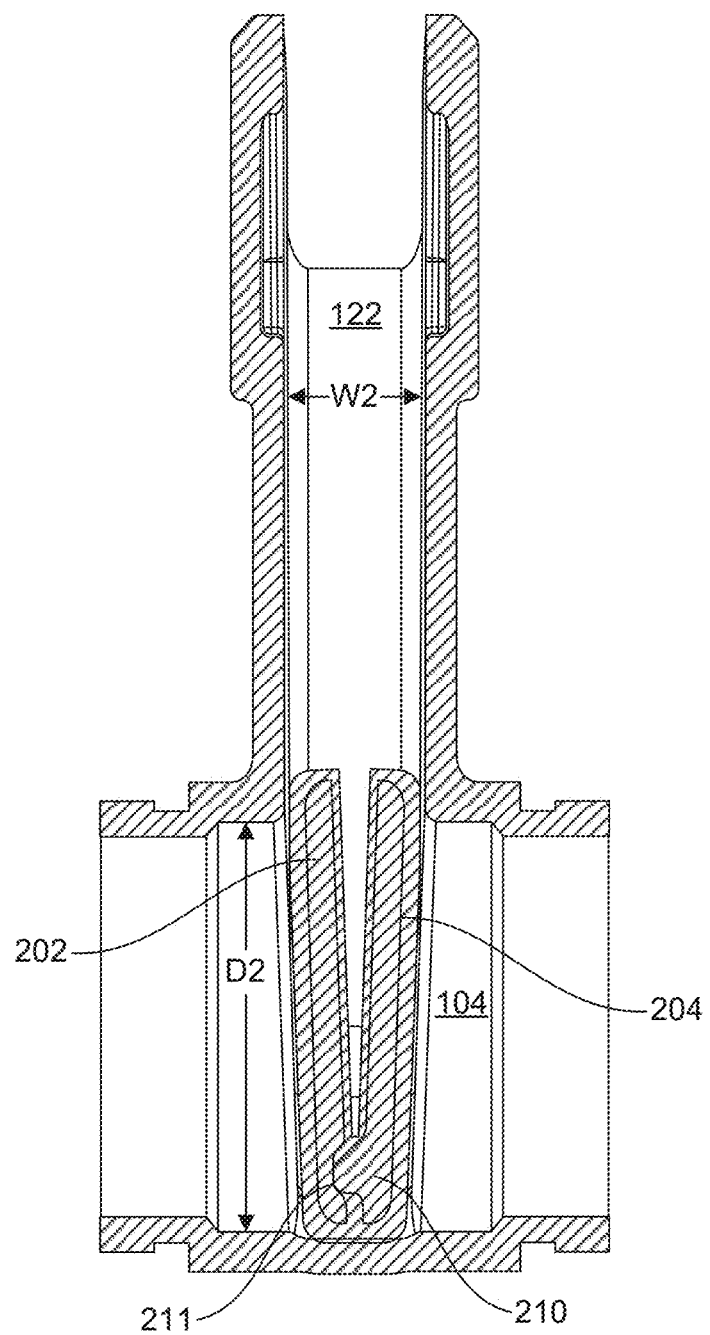
FIG. 7 shows a cross sectional side view of the wedge gate valve of FIG. 6.
Figure 8:
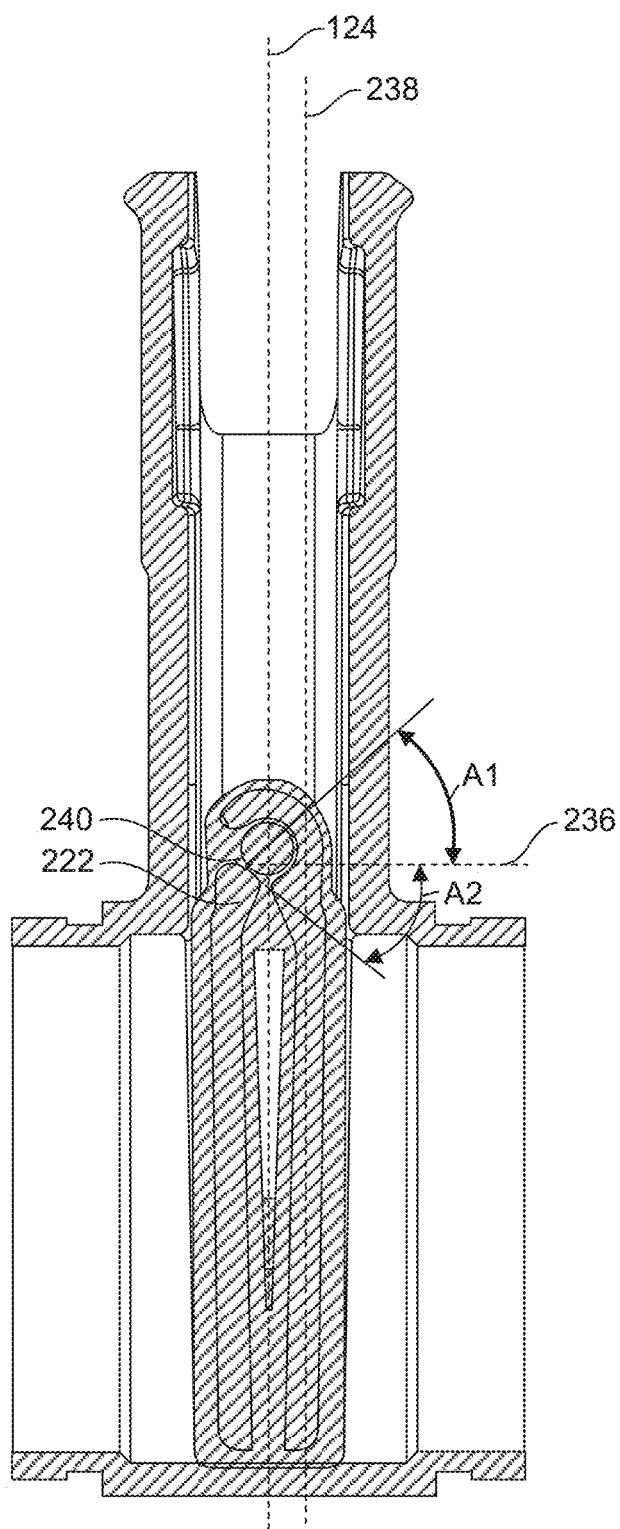
FIG. 8 shows a cross sectional side view of the wedge gate valve of FIG. 6.
Figure 9:
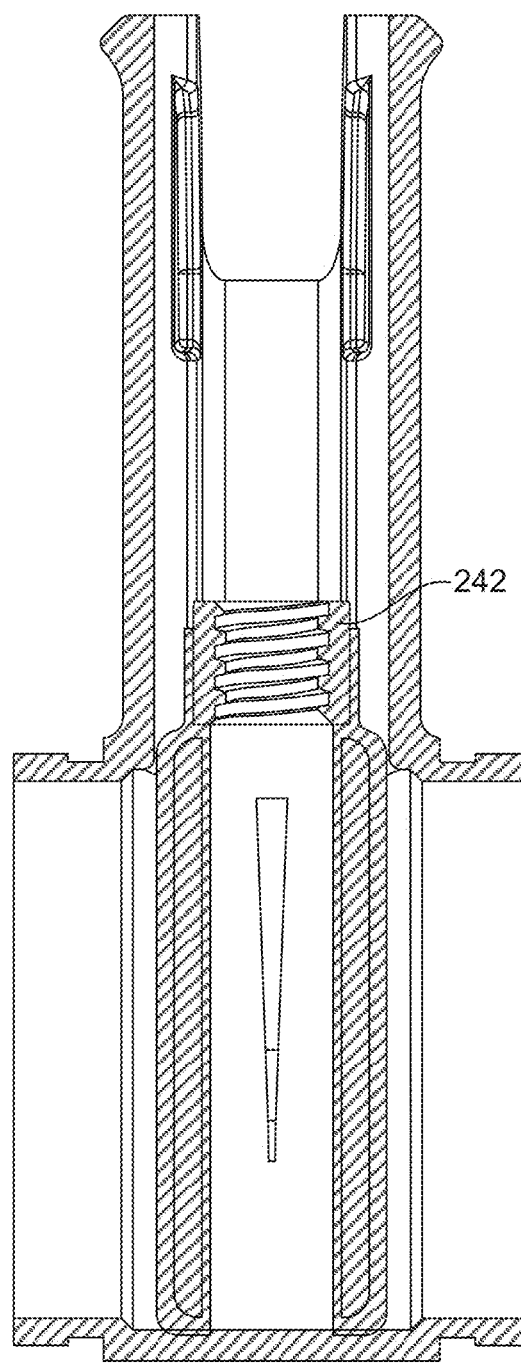
FIG. 9 shows a cross sectional side view of the wedge gate valve of FIG. 6.

FIG. 5 shows a perspective view of a gate valve body 200, according to an embodiment, and a perspective view of the gate 120 fully assembled and exploded. FIG. 6 shows a front view of the gate valve body 200, with the gate 120 in the gate valve body 200. FIGS. 7, 8, and 9 show cross sectional side views of the gate valve body and gate 120 along section lines C, B, and A, respectively. Referring to FIGS. 5-9, the gate valve body 200 is identical to the gate valve body 102, with the except that the gate valve body 200 omits the first and second flanges 110, 112 of the gate valve body 102. All other features of the gate valve body 200 are referenced and labeled the same as the gate valve body 102.

The gate 120 includes a first body portion 202 and a second body portion 204, that are configured to connect and be held together or wedged apart, pivoting apart like a clamshell. The first body portion 202 and the second body portion 204 can each have a shape to match and seal the flow passage 104, which is generally like a disc with the center guide 136. The first body portion 202 has an exterior surface 203, on the second side 144 of the gate 120, facing away from the second body portion 204. The second body portion 204 has an exterior surface 205, on the first side 138 of the gate 120, facing away from the first body portion 202. The first body portion 202 and the second body portion 204 are configured to be pivoted to a position wherein the exterior surface 203 of the first body portion 202 and the exterior surface 205 of the second body portion 204 are substantially parallel. In this position, a maximum width W2 of the gate 120, excluding the center guide 136, is substantially uniform across the entire diameter D1 of the disc. The maximum width W2 is smaller than that of conventional gates by at least the extra width of the wedge portion in conventional gates. Accordingly, the gate channel 122 is that much smaller as well, because the width W1 of the gate channel 122 can be minimally larger than the width W1, and can be constant across a length extending from an intersection of the flow passage 104 and the gate channel 122 away from the flow passage 104. In some embodiments, the width W1 can taper over the length to the intersection of the flow passage 104 and the gate channel 122 at an angle less than five degrees, less than four degrees, less than three degrees, less than two degrees, or less than one degree. The smaller resulting maximum value for the width W1 translates to a significant reduction in material and weight of the gate valve 102.

A first pivot connection element 210 and a second pivot connection element 211 are on an inside surface 212 of the first body portion 202 and on an inside surface 213 of the second body portion 204 near, adjacent, or at a perimeter of the disc, with the center guide 136 between the first pivot connection element 210 and the second pivot connection element 211. To facilitate making the first body portion 202 and the second body portion 204 identical, one of first and second pivot connection elements 210, 211 can be "male" and the other can be "female". In particular, one of the first and second pivot connection elements 210, 211 on the first body portion 202 can have a protruding portion 214 that is angled or arched to fit in a receptacle 216 of the other on the second body portion 204, and to facilitate pivoting of the first body portion 202 with respect to the second body portion 204. Alternatively, the first and second pivot connection elements 210, 211 of the first body portion 202 can be identical—either male or female, and then matching pivot connection elements on the second body portion 204 can be identical—the other of male or female. Two pivot connection elements are depicted on each body portion, 202, 204, and symmetrically placed on either side of the center guide 136, to facilitate stable pivoting. More or less pivot connection elements 210, 211 can be included, though.

The pivoting is facilitated by a first wedging element 220 and a second wedging element 222. Each of the first body portion 202 and the second body portion 204 include the first wedging element 220 and the second wedging element 222. The first wedging element 220 and the second wedging element 222 extend from the perimeter of the disc at a location diametrically opposed to the location of the first and second pivot connection elements 210, 211, adjacent the center guide 136, with the center guide 136 between the first wedging element 220 and the second wedging element 222. The first wedging element 220 includes a first wedging surface 230 and a hook 232. Referencing the second body portion 204 as an example, the first wedging surface 230 and the hook 232 together define a slot 234 oriented at an angle A1 between 0 and 90 degrees toward the first body portion 202 from a plane 236 perpendicular to a plane 238 of the disc shape of the second body portion 204. The first wedging surface 230 is approximately equal to the angle A1. Here, "approximately" can mean plus or minus anywhere from 10 degrees, to plus or minus 0.1 degrees. The angle A1 can also be between 15 and 75 degrees, 30 and 60 degrees, or another range, such that pressure against the first wedging surface 230 parallel to the center axis 124 of the gate channel 122 forces the second body portion 204 to pivot apart from the first body portion 202. Axial pressure against the hook 232 from within the slot 234 draws the second body portion 204 pivotably toward the first body portion 202.

The second wedging element 222 includes a second wedging surface 240. Still referencing the second body portion 204 as an example, the second wedging surface faces at an angle A2 between 0 and 90 degrees from radially outward toward the plane 238 of the disc shape of the second body portion 204. The angle A2 can also be between 15 and 75 degrees, 30 and 60 degrees, or another range, such that pressure against the second wedging surface 230 in a direction parallel to the center axis 124 of the gate channel 122 forces the second body portion 204 to pivot apart from the first body portion 202.

To facilitate symmetrical forces driving movement between the open and closed positions of the gate valve 100, and to facilitate making the first and second body portions 202, 204 identical, each of the first body portion 202 and the second body portion 204 can have the first wedging element 220 and the second wedging element 222, as illustrated in the figures, though other numbers and arrangements of the first and second wedging elements 220, 222 are conceived.

Pressure is applied to the first wedging surface 230, the hook 232, and the second wedging surface 240 by rotating the stem 130, which as discussed above, engages the threaded portion 135 of the gate 120, such that the gate 120 is threaded linearly along the threaded portion 134 of the stem 130. The threaded portion of the gate 120 is part of a threaded collar 242 configured to be positioned between the first and second wedging elements 220, 222 of each of the first body portion 202 and the second body portion 204. The collar 242 includes two wedge pins 244, which each extend into one of the respective slots 234. The first and second body portions 202, 204 are biased toward each other at the first and second wedging elements 220, 222 such that as the collar 242 is moved along the threaded portion 134 of the stem 130 toward the center of the first and second body portions 202, 204, if there is no other force on the gate, then the first body portion 202 and the second body portion 204 move with the collar 242. If there is another resistive force against movement of the first and second body portions 202, 204, though, such as occurs when the first and second body portions 202, 204 are pushed into the perimeter surface 114 of the flow passage 104, then the collar 242 continues to move axially a distance relative to the first and second body portions 202, 204, and the wedge pins 244 press against the first and second wedging surfaces 230, 240, thereby pivotably wedging apart the first and second body portions 202, 204. FIGS. 6-9 show the gate 120 in the closed position, with the first body portion 202 and the second body portion 204 wedged apart from each other at the first and second wedging elements 220, 222.

Moving the collar 242 in the opposite direction, toward the valve cover 170, presses the wedge pins 244 against the hook 232, which combined with the bias of the first and second body portions 202, 204 toward each other, draws the first and second body portions 202, 204 toward each other if there is room for the first and second body portions 202, 204 to move in this fashion, after which, the first and second body portions 202, 204 move in synchronization with the collar 242.

The assembled gate 120 can have an elastic rubber jacket or coating 250 (shown in FIGS. 3 and 5), which can provide the bias of the first and second body portions 202, 204 toward each other. Further, the rubber jacket or coating 250 can facilitate sealing between surfaces of the gate 120 and surfaces of valve body 102.

Figure 10:
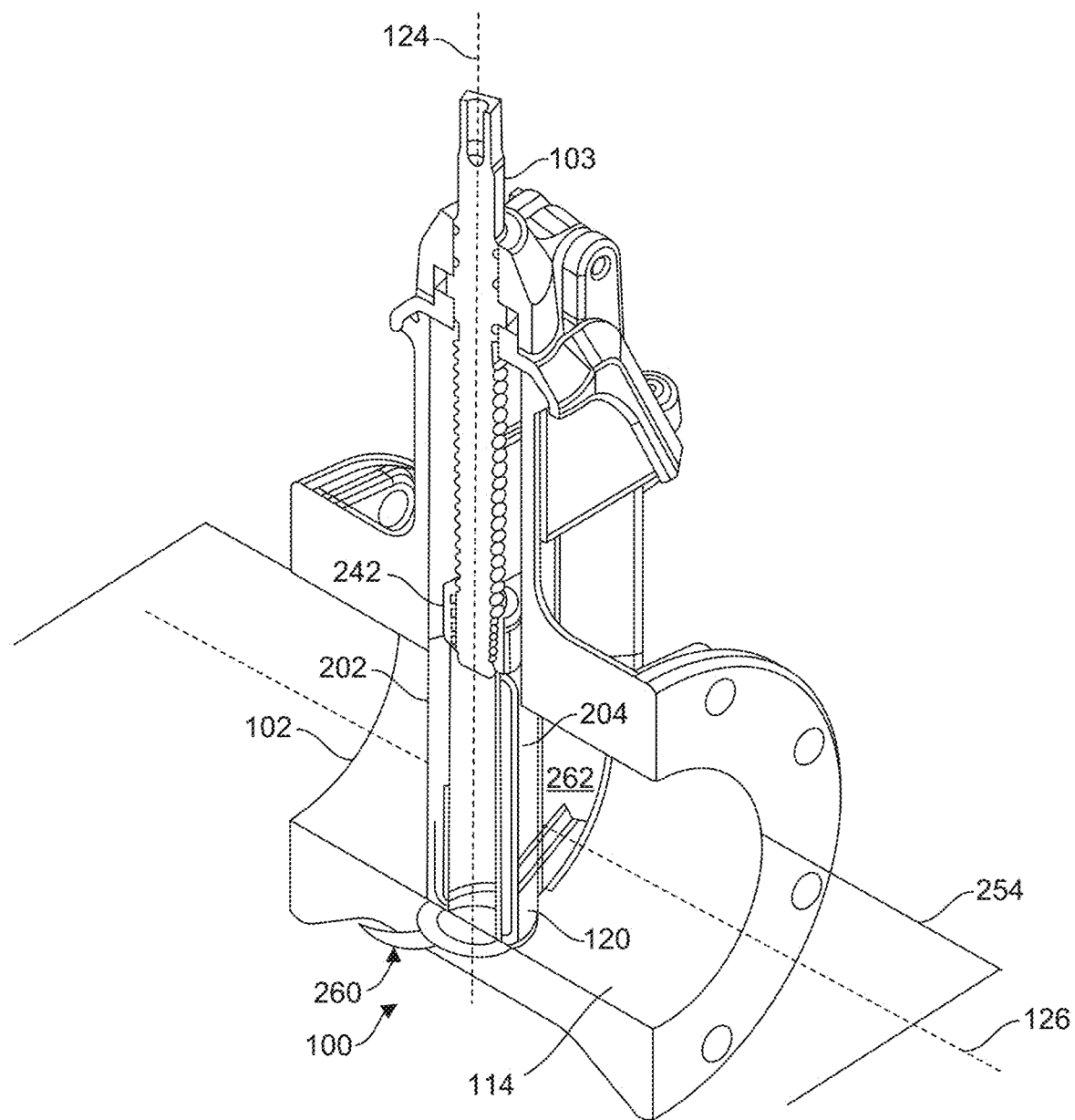
FIG. 10 shows a cut away perspective view of the wedge gate valve of FIG. 3, with a radially facing surface sealing against a perimeter surface of a flow passage, the sealing of the radially facing surface highlighted.
Figure 11:
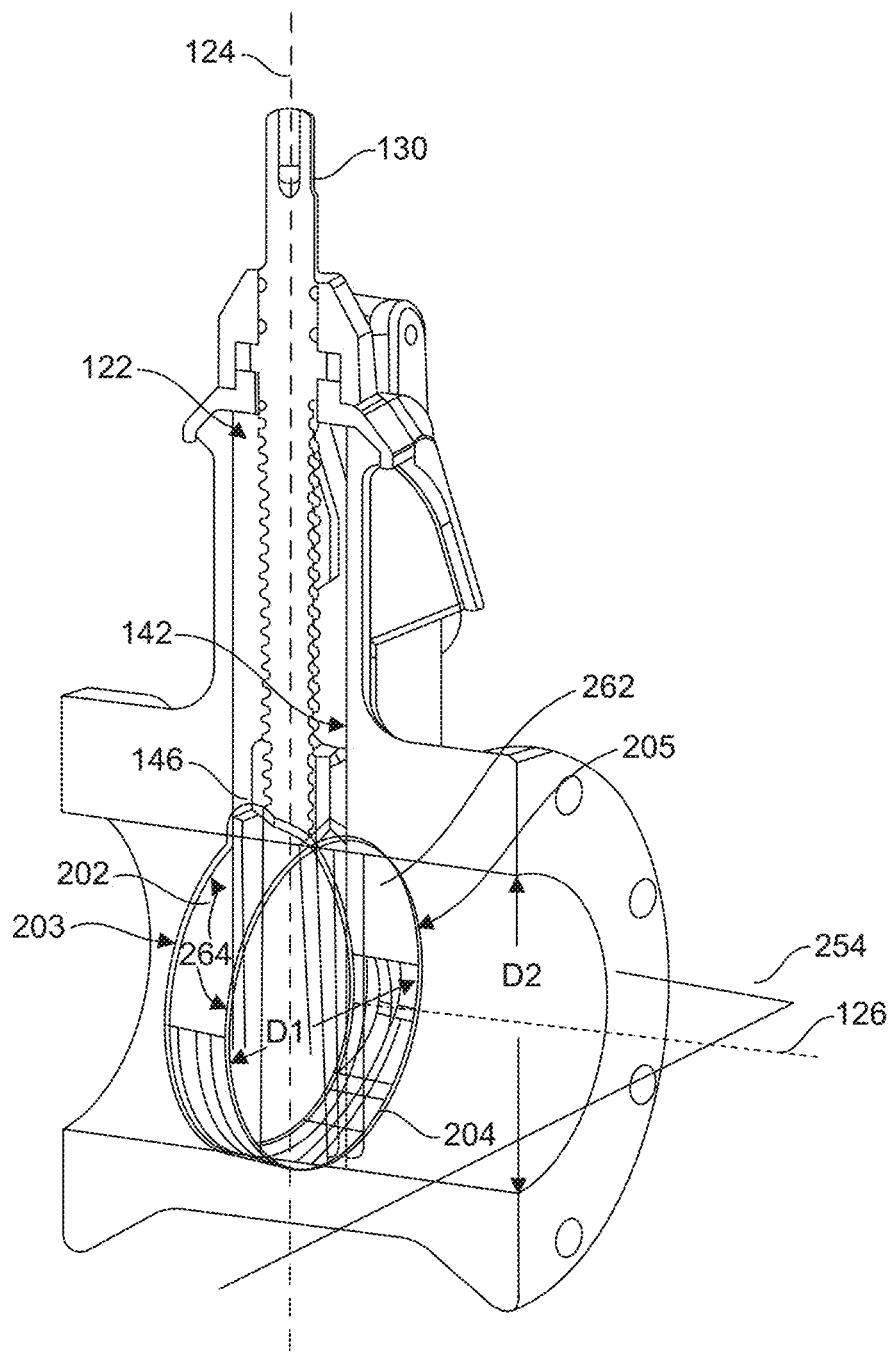
FIG. 11 shows a cut away perspective view of the wedge gate valve of FIG. 3, with the gate wedged axially to form a seal between axially facing surfaces of the gate and the gate valve body, the seal highlighted.
Figure 12:
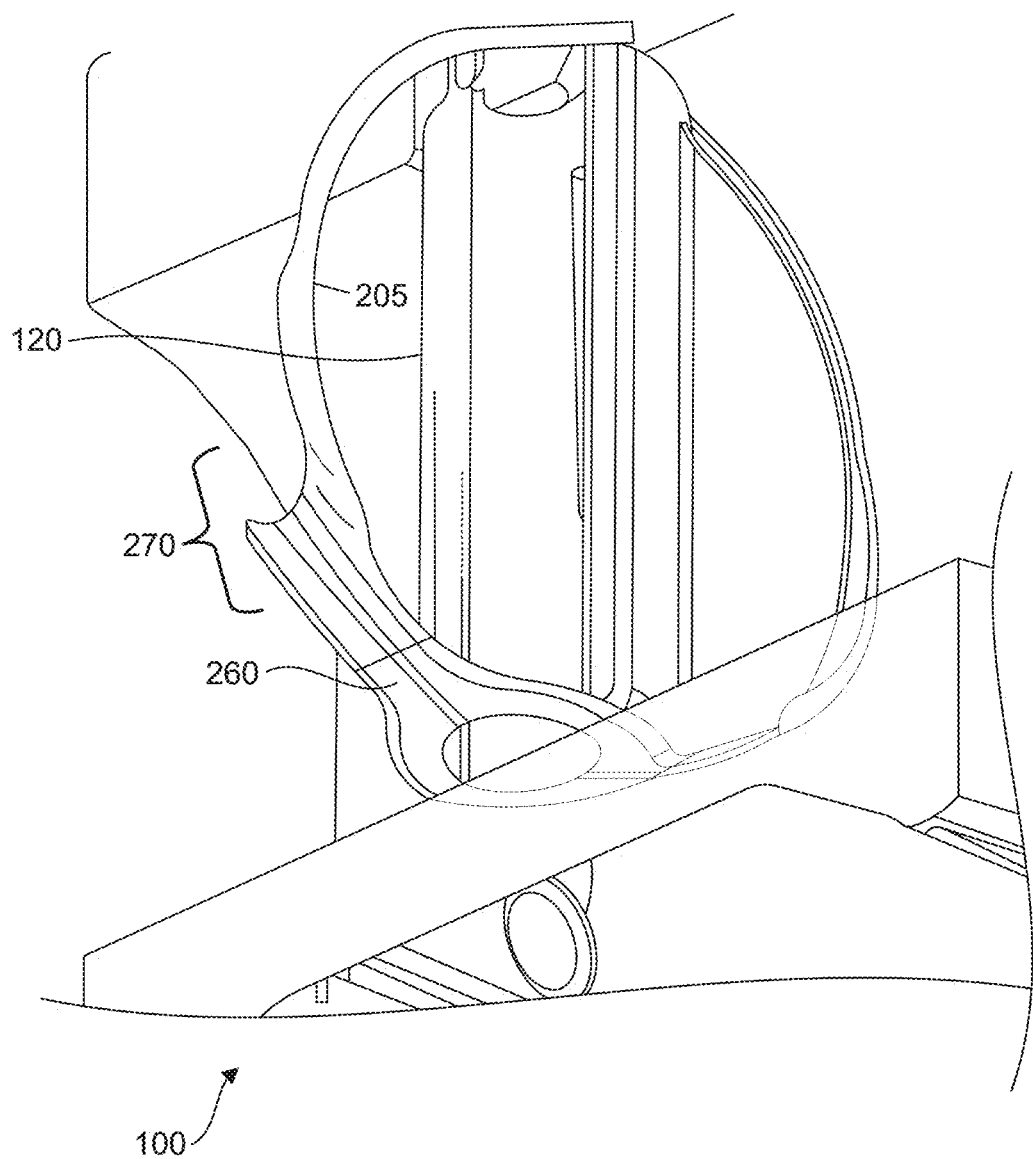
FIG. 12 shows a cut away perspective view of the wedge gate valve of FIG. 3, with the gate in a closed position, and the seal transition between a radially facing surface of the gate and an axially facing surface of the gate, the seal transition highlighted.

FIGS. 10-12 show the formation of the seal between the gate 120 and the valve body 102 as the gate 120 moves into the closed position and the first and second body portions 202, 204 are wedged apart. FIG. 10 shows a cut away, partially transparent perspective view of the wedge gate valve 100 of FIG. 3. As the stem 130 is rotated and the collar 242 pushes the first and second body portions 202, 204 toward the perimeter surface 114 of the flow passage 104, a radially facing surface 260 of the first and second body portions 202, 204 contacts the perimeter surface 114.

At this position, as the stem 130 is further rotated, the first and second body portions 202, 204 can move no further along the center axis 124 of the stem 130, and the wedge pins 244 wedge apart the first and second body portions 202, 204. FIG. 11 shows a cut away, partially transparent, perspective view of the wedge gate valve 100 of FIG. 3, with the first and second body portions 202, 204 wedged apart. The diameter D1 of the gate 120 can be larger than a diameter D2 (see FIG. 3) of the flow passage 104, such that in this closed position, the exterior surfaces 203, 205 of the first and second body portions 202, 204 seal against the second and first side walls 146, 142 of the gate channel 122. Referring to FIG. 10 and FIG. 11, a semi-annular slot 262 extends from the gate channel 122 through the perimeter surface 114 beyond a plane 254 perpendicular to the center axis 124 of the gate channel 122, the plane 254 parallel to and intersecting with the center axis 126 of the flow passage 104. In other words, an internal span S of the gate channel 122 is greater than the diameter D2 of the flow passage 104, as measured through the diameter D2, and the gate channel 122 encircles a majority of a circumference of the flow passage 104, thereby defining, at least in part, the semi-annular slot 262.

The gate 120 fits within the semi-annular slot 262, and the diameter D1 of the gate is large enough such that the gate 120 extends into the semi-annular slot 262. The semi-annular slot 262 has surfaces 264 that face generally in a direction parallel to the center axis 126 of the flow passage 104. When the first and second body portions 202, 204 are wedged apart, the exterior surfaces 203, 205 contact and seal against these axially-facing surfaces 264.

FIG. 12 shows a cut away perspective view of the wedge gate valve 100 of FIG. 3, with the gate 120 in a closed position. The semi-annular slot 262 tapers out relatively gradually into the perimeter surface 114. The interaction between the semi-annular slot 262, its gradual taper, and the location of the taper with the gate 120 help define a seal transition 270 between the radially facing surface 260 of the gate 120 and the axially facing exterior surface 205 of the gate 120. The transition 270 is more gradual, with more overlap, than in conventional gate valves. The transition 270 is also closer to a location on the perimeter of the gate 120 diametrically opposite the collar 242 than in conventional wedge gate valves, such that the transition 270 experiences more axial force into the perimeter surface 114 of the flow passage 104. With the greater axial force, the radially facing surface 260 has a greater likelihood of sealing at the transition 270, in addition to the sealing of the exterior surface 205 at the transition 270. As a result, the valve body 102 including the semi-annular slot 262, and the gate 120 can be manufactured with less precision and greater tolerance, and hence less cost, to achieve a seal with integrity equal to or better than conventional wedge gate valves.

Further, the fit of the gate 120 within the semi-annular slot 262 can assist guidance of the gate 120 movement between the open and closed position.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A gate valve comprising:
a valve body including a first opening, a second opening, a flow passage from the first opening to the second opening, and a gate channel intersecting the flow passage; and
a gate configured to move along a center axis of the gate channel between a closed position where the gate is fully in the flow passage to block fluid flow through the flow passage and an open position where fluid can flow through the flow passage, the gate comprising:
a first body portion having a disc shape and a first wedging element extending from the disc shape; and
a second body portion having a disc shape and a second wedging element extending from the disc shape, the second body portion pivotably connected to the first body portion,
the first wedging element including a wedging surface and a hook, the wedging surface and the hook together defining a slot angled between 0 and 90 degrees toward the second body portion from a plane perpendicular to a plane of the disc shape of the first body portion.

2. The gate valve of claim 1, wherein the first body portion is pivotably connected to the second body portion at a region of the first body portion and the second body portion diametrically opposed to the first wedging element and the second wedging element.

3. The gate valve of claim 1, wherein the first wedging element is biased toward the second wedging element.

4. The gate valve of claim 3, wherein the first body portion has a surface facing away from the second body portion, the second body portion has a surface facing away from the first body portion, and the first body portion and the second body portion are biased toward a position wherein the surface of the first body portion and the surface of the second body portion are parallel.

5. The gate valve of claim 1, wherein the first body portion has a center guide and a diameter, the center guide being a convex ridge extending across the diameter, wherein the gate channel is defined in part by two side walls facing parallel to a center axis of the flow passage, and wherein at least one of the side walls has a concave slot extending along a center of the side wall, the center guide congruent with the concave slot to guide the gate during movement of the gate in the gate channel.

6. The gate valve of claim 1, wherein the gate further comprises a collar with a wedge pin, the wedge pin configured to engage the first wedging element and the second wedging element, the collar configured to move toward a center of the first body portion and the second body portion such that the wedge pin presses apart the first wedging element and the second wedging element.

7. The gate valve of claim 6, further comprising a stem with a threaded portion, the collar having threads, the threaded portion of the stem configured to extend along the center axis of the gate channel and to engage the threads of the collar, such that rotation of the stem drives the collar toward the center of the first body portion and the second body portion.

8. The gate valve of claim 6, wherein the wedge pin is configured to slide in the slot as the collar is moved and as the first body portion pivots with respect to the second body portion.

9. The gate valve of claim 1, wherein the angle of the slot is between 15 and 75 degrees.

10. The gate valve of claim 1, wherein the second wedging element has a wedging surface facing at an angle between 0 and 90 degrees from radially outward toward a plane of the disc shape of the first body portion.

11. The gate valve of claim 10, wherein the angle of the wedging surface of the second wedging element is between 15 and 75 degrees.

12. The gate valve of claim 6, wherein the first body portion includes a third wedging element, wherein the second body portion includes a fourth wedging element, wherein the collar includes a second wedge pin, wherein the second wedge pin is configured to engage the third wedging element and the fourth wedging element, and wherein the collar is configured to move toward the center of the first body portion and the second body portion between the first wedging element and the third wedging element and between the second wedging elements and the fourth wedging element.

13. The gate valve of claim 12, wherein the first wedging element and the fourth wedging element each include a hook defining a slot, the wedge pin configured to slide in the slot as the collar is moved and as the first body portion pivots with respect to the second body portion, and wherein the second wedging element and the third wedging element each have a wedging surface facing at an angle between 0 and 90 degrees from radially outward toward a plane of the disc shape of the first body portion.

14. A gate for a gate valve, the gate comprising:
a first body portion having a disc shape and a first wedging element extending from the disc shape; and
a second body portion having a disc shape and a second wedging element extending from the disc shape, the second body portion pivotably connected to the first body portion,
the first wedging element including a wedging surface and a hook, the wedging surface and the hook together defining a slot angled between 0 and 90 degrees toward the second body portion from a plane perpendicular to a plane of the disc shape of the first body portion.

15. The gate of claim 14, wherein the first body portion is pivotably connected to the second body portion at a region of the first body portion and the second body portion diametrically opposed to the first wedging element and the second wedging element.

16. The gate of claim 14, wherein the first wedging element is biased toward the second wedging element.

17. The gate of claim 16, wherein the first body portion has a surface facing away from the second body portion, the second body portion has a surface facing away from the first body portion, and the first body portion and the second body portion are biased toward a position wherein the surface of the first body portion and the surface of the second body portion are parallel.

18. The gate of claim 14, wherein the first body portion has a center guide and a diameter, the center guide being a convex ridge extending across the diameter.

19. The gate of claim 14, further comprising a collar with a wedge pin, the wedge pin configured to engage the first wedging element and the second wedging element, the collar configured to move toward a center of the first body portion and the second body portion such that the wedge pin presses apart the first wedging element and the second wedging element.

20. The gate of claim 19, wherein the wedge pin is configured to slide in the slot as the collar is moved and as the first body portion pivots with respect to the second body portion.

21. The gate of claim 14, wherein the angle of the slot is between 15 and 75 degrees.

22. The gate of claim 14, wherein the second wedging element has a wedging surface facing at an angle between 0 and 90 degrees from radially outward toward a plane of the disc shape of the first body portion.

23. The gate of claim 22, wherein the angle of the wedging surface of the second wedging element is between 15 and 75 degrees.

24. The gate of claim 19, wherein the first body portion includes a third wedging element, wherein the second body portion includes a fourth wedging element, wherein the collar includes a second wedge pin, wherein the second wedge pin is configured to engage the third wedging element and the fourth wedging element, and wherein the collar is configured to move toward the center of the first body portion and the second body portion between the first wedging element and the third wedging element and between the second wedging elements and the fourth wedging element.

25. The gate of claim 24, wherein the first wedging element and the fourth wedging element each include a hook defining a slot, the wedge pin configured to slide in the slot as the collar is moved and as the first body portion pivots with respect to the second body portion, and wherein the second wedging element and the third wedging element each have a wedging surface facing at an angle between 0 and 90 degrees from radially outward toward a plane of the disc shape of the first body portion.

* * * * *